Figure 1:
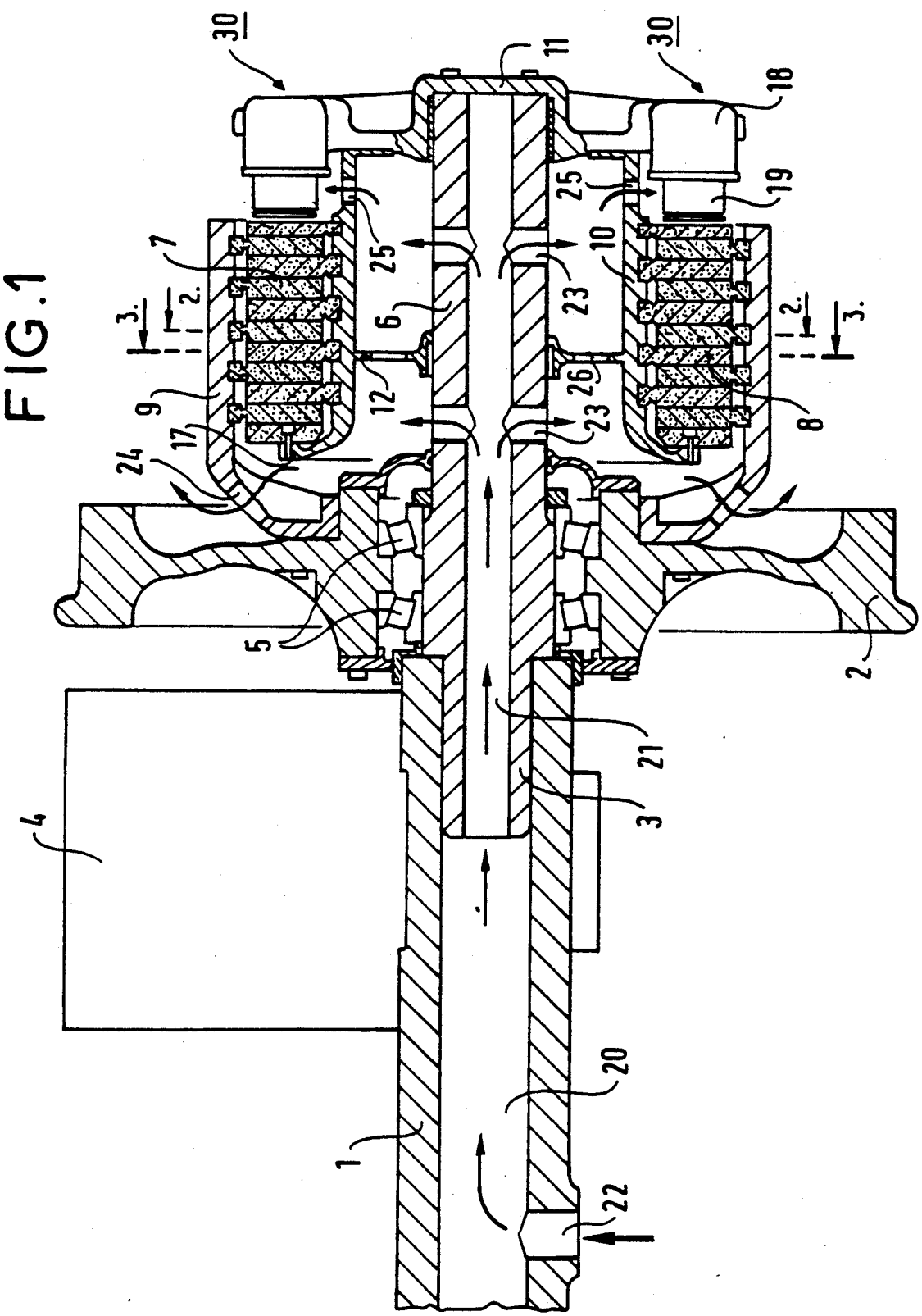

United States Patent [19]
Guiot et al.

[11] Patent Number: 5,215,168
[45] Date of Patent: Jun. 1, 1993

[54] BRAKING SYSTEM FOR A RAILWAY VEHICLE

[75] Inventors: Jean-Luc Guiot, Lieu Saint Amand; Alain Devallez, Raismes, both of France

[73] Assignee: GEC Alsthom SA, Paris, France

[21] Appl. No.: 783,871

[22] Filed: Oct. 29, 1991

[30] Foreign Application Priority Data

Oct. 30, 1990 [FR] France ................. 90 13450

[51] Int. Cl.⁵ ............... F16D 65/847; F16D 55/40
[52] U.S. Cl. ................. 188/71.6; 188/59; 188/71.5; 188/264 A
[58] Field of Search ............. 188/71.5, 71.6, 58, 188/59, 264 A, 264 AA, 264 E, 264 P; 192/20.13, 113 A

[56] References Cited

U.S. PATENT DOCUMENTS

| | | | |
|---|---|---|---|
| 2,148,818 | 2/1939 | Kattwinkel | 188/71.6 X |
| 2,277,106 | 3/1942 | Hewitt | 188/264 A X |
| 2,552,571 | 5/1951 | Mercier | 188/264 AA |
| 2,655,236 | 10/1953 | Bachman | 188/71.6 X |
| 2,922,495 | 1/1960 | Griswold | 188/264 AA X |
| 3,664,467 | 5/1972 | Lucien | 188/71.6 |
| 4,878,563 | 11/1989 | Baden et al. | 188/71.5 |

FOREIGN PATENT DOCUMENTS

| | | | |
|---|---|---|---|
| 8204108 | 11/1982 | Australia . | |
| 107132 | 8/1980 | Japan | 188/264 E |
| 535191 | 9/1939 | United Kingdom . | |
| 2183755 | 12/1985 | United Kingdom . | |

Primary Examiner—George E. A. Halvosa
Attorney, Agent, or Firm—Sughrue, Mion, Zinn, Macpeak & Seas

[57] ABSTRACT

A braking system for a railway vehicle having bogies which have fixed axles and independent wheels, the braking being of the disk-brake type. Each brake includes multiple disks comprising rotary disks (7) secured to the wheel (2) to be braked and fixed disks (8) secured to the axle (1) carrying the wheel to be braked, braking being obtained by pressing the fixed disks against the rotary disks, the system also including a cooling circuit enabling the heat energy generated by braking to be dissipated, cooling being obtained by a forced flow of fluid through the circuit.

5 Claims, 2 Drawing Sheets

BRAKING SYSTEM FOR A RAILWAY VEHICLE

The invention relates to a braking system for a railway vehicle having bogies which have fixed axles and independent wheels.

Currently, research is being directed into making it possible for very high speed trains to travel at higher and higher speeds. It is planned to reach commercial speeds of about 400 km/h. This immediately poses the problem of braking a train at such speeds, given the high energy to be dissipated and the low adhesion existing between the wheels of the train and the rails.

In general, on present very high speed trains, a plurality of braking means are used in association. For instance, for the T.G.V. (French very high speed train) which reaches speeds of about 270 km/h, three braking means are provided:

firstly, there are rheostatic brakes mounted on the driving axles and disk brakes mounted on the load-carrying axles, these brakes being used jointly to bring the train from its maximum speed to a standstill; and secondly there is a braking system having shoes on wheels of the motorized bogies, this brake being used below 160 km/h.

This braking system is effective for trains travelling at the given speeds. However, it is completely ineffective if applied to trains which are to travel at much higher speeds (about 400 km/h), the friction brake being the only brake capable of stopping the train.

In the fields of aviation and of Formula 1 motor racing, there is a known braking system of the multiple carbon disk brake type which provides effective braking for the vehicles in question. This type of brake has a very considerable capacity for dissipating energy.

However, adapting a multiple disk braking system to a train required to travel at very high speeds is not easy for several reasons.

At very high speeds, it is essential to have bogies which are highly stable, and which therefore have independent wheels. Therefore, since the axles are fixed, braking must be effected directly on the wheels or on members attached to the wheels. This gives rise to the problem of how to remove heat after braking. Heat generated by braking in the proximity of the wheel hubs must be prevented from passing to the wheel bearings. In general, the wheel bearings are constituted by conical bearings which are sensitive to heat. If the heat given off is too intense, there is a risk that the wheel will bind on its axle.

Advantageously, the multidisk brakes are of the carbon-carbon type for greater effectiveness. It is known that carbon brakes have maximum effectiveness in a temperature range of approximately 300° C. to approximately 600° C. Therefore, during braking, the temperature of the carbon disks must quickly reach a value corresponding to the most effective possible operation, but this temperature must not exceed the range of best effectiveness.

Therefore, the disk brakes must be brought quickly to a relatively high temperature, while avoiding overheating the wheel bearings situated in the proximity thereof.

An object of the present invention is to meet these requirements. A braking system of the invention is constituted by a plurality of components arranged so as to constitute a heatsink for the brake disks. A cooling circuit is provided for cooling the surroundings containing the bearings and for preventing the disk brakes from overheating.

The invention therefore provides a braking system for a railway vehicle having bogies which have fixed axles and independent wheels, the braking being of the disk-brake type, said braking system being characterized in that each brake includes multiple disks comprising rotary disks secured to the wheel to be braked and fixed disks secured to the axle carrying the wheel to be braked, braking being obtained by pressing the fixed disks against the rotary disks, the system also including a cooling circuit enabling the heat energy generated by braking to be dissipated, cooling being obtained by a forced flow of fluid through the circuit.

Advantageously, the rotary disks are secured to the wheel via a cylindrical support fixed to the wheel, with the axis of the wheel coinciding with the axis of the rotary disk support.

In the same way, the fixed disks may be secured to the axle via a cylindrical support fixed to the axle, with the axis of the axle coinciding with the axis of the fixed disk support.

Figure 2:
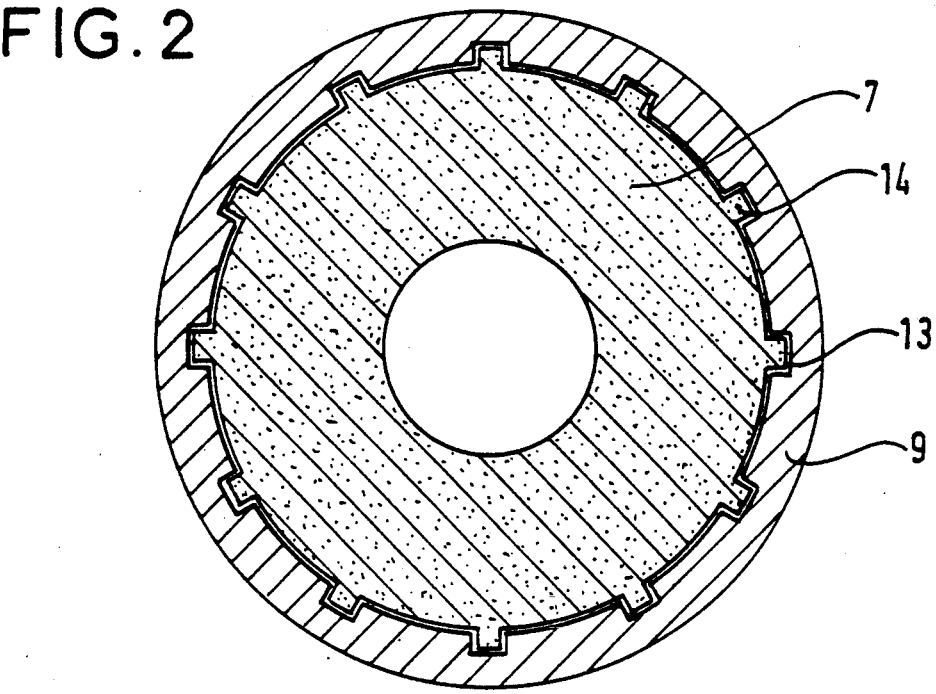
Figure 3:
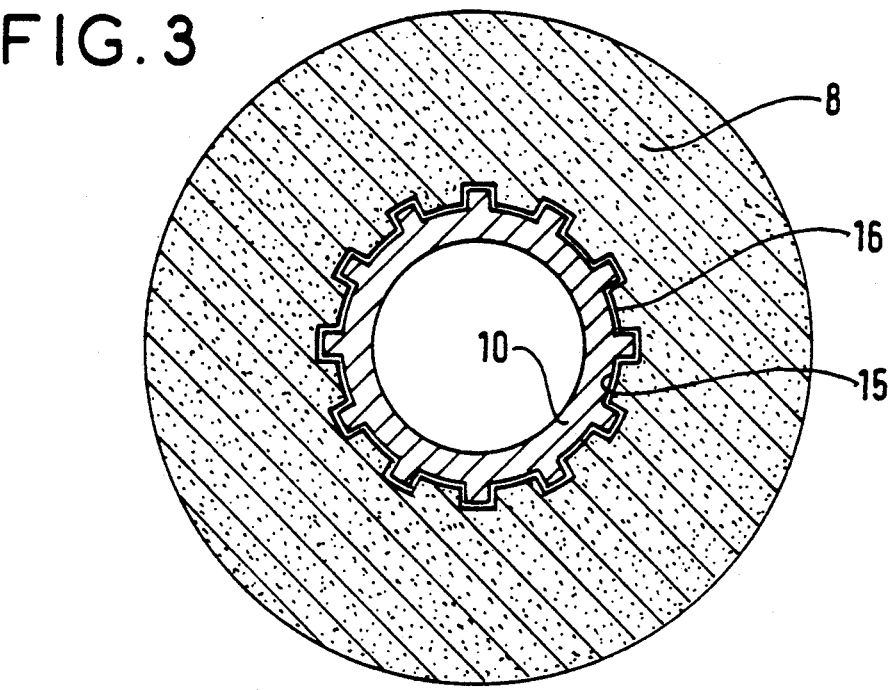

The invention will be better understood and other advantages will appear on reading the following non-limiting description given with reference to the accompanying drawings, in which:

FIG. 1 is a generally sectional view of a half axle whose wheel is equipped with a braking system of the invention; and FIGS. 2 and 3 are fragmentary views of components of the braking system of the invention.

FIG. 1 shows a half axle 1 on which a wheel 2 is mounted via an attached axle stub 3. The axle supports a bogey (not shown) via a primary suspension. Part of such a primary suspension is shown referenced 4. The wheel is mounted conventionally so as to abut against the shoulder constituted by the end of the axle. The wheel is free to rotate about the stub 3 by means of bearings constituted by conical roller bearings 5.

The stub 3 extends a certain length beyond the wheel in a projecting portion 6. In this embodiment, the braking system of the invention is constituted about the projecting portion.

According to the invention, the brake includes multiple disks comprising rotary disks 7 secured to the wheel to be braked and fixed disks 8 secured to the axle 1.

The rotary disks 7 are secured to the wheel via a rotary portion fixed to the wheel. The fixed disks 8 are secured to the axle via a fixed portion tied to the axle.

In FIG. 1, the rotary portion is constituted by a cylindrical support 9 fixed by screws to the central and outer portion of the wheel 2, with the axes of the cylindrical support and of the wheel coinciding. The rotary disks 7 are disposed inside the cylindrical support 9.

The fixed portion is also constituted by a cylindrical support 10 having its axis coinciding with the axis of the stub 6. The fixed disks 8 are disposed on the outside periphery of the cylindrical support 10. This support 10 is extended by an end piece or is fixed to an end piece 11 as shown in FIG. 1. The support 10 may be fixed to the piece 11 by screws, as may the piece 11 to the end of the stub 6.

The cylindrical support 10 also includes an internal ring-shaped collar 12. This collar slides snugly along the stub 6, so as to ensure that the support 10 is positioned correctly.

FIG. 2 is a view of cylindrical support 9 on a section 22. The support has grooves 13 machined longitudinally in its inside volume. The rotary disks 7 have lugs 14 corresponding to the grooves 13 and situated on the outside periphery of the disks 7. As shown in FIG. 2, the disks 7 are rotated by the support 9.

FIG. 3 is a view of cylindrical support 10 on the same section 33. The support has grooves 15 machined longitudinally in its outside volume. The fixed disks 8 have lugs 16 corresponding to the grooves 15 and situated on the inside periphery of the disks 8. As shown in FIG. 3, the disks 8 are prevented from rotating by the support 10.

Cylindrical support 10 ends in an annular abutment 17. The disks are assembled in the following manner. Firstly, a first non-rotary disk is fixed to the abutment 17, e.g. by screws. Support 10 is placed in the position shown in FIG. 1 relative to support 9. The first rotary disk (the rotary disk 7 which is to be closest to the wheel) is fitted into its support and it is slid as far as possible, i.e. up against the first non-rotary disk. The second non-rotary disk is then fitted onto its support, and it is slid up against the first rotary disk. The operation is continued in this way by alternating the rotary disks and the non-rotary disks.

A certain number of actuators are provided so that the fixed disks can be pressed against the rotary disks to exert a braking force. FIG. 1 shows two such actuators 30. They comprise cylinders 18 fixed to the end piece 11, and pistons 19 which can be actuated from the cylinders in a manner known per se.

The disks are assembled so that there is a minimum clearance between each disk when the train is in motion without the braking system being applied. When the train starts, the rotary disks, which are very slightly warped, move away from the fixed disks. When the train brakes, the first disk is pushed by the pistons, thereby displacing the following disks. The retaining force is thus obtained by the simultaneous pressure on the various rotary and fixed disks.

When braking is not being applied, there is clearance between each actuator piston and the fixed disk facing it, which clearance takes up the sum of the clearances between disks.

The numbers of disks and of actuators are functions of the braking force required. For example, in order to brake a train travelling at 400 km/h, each brake might include 5 or 6 pairs of disks and about 12 evenly distributed hydraulic piston actuators. The braking force is a function of the number of actuators.

Advantageously, the cooling circuit may be constituted as shown in FIG. 1. The circuit shown is composed of an axial hole 20 made through the body of the axle 1 and extended by an axial hole 21 made through the axle stub 3. The circuit also includes an inlet orifice 22 for the cooling fluid, which orifice is provided in the axle, and outlet orifices 23 for the fluid, which orifices are provided in the stub 3. Expulsion orifices 24, 25 for expelling the cooling fluid to the outside are provided in the cylindrical supports 9 and 10. The collar 12 may also have through holes 26 to facilitate fluid flow.

The cooling fluid can thus flow through the arrowed circuit shown in FIG. 1. The bearings are thus cooled in the best possible way, both via the stub and via the hub of the wheel.

The disposition of the disks in the space existing between the two cylindrical supports and their relative distance from the cooling fluid intake contributes to making a heatsink for the disks, thereby making it possible to maintain a mean temperature that makes effective braking possible when the fixed disks are pressed against the rotary disks.

Advantageously, the cooling fluid may be air which is force fed into the cooling circuit. For instance, it is possible to use compressed air available from a compressor that is provided for other purposes.

The cooling circuit may be started automatically on braking.

We claim:

1. In a braking system for a high-speed railway vehicle capable of operating at speeds of about 400 km/h, said vehicle including bogies having fixed axles, independent wheels mounted on opposite ends of said axles for rotation about the wheel axes, said bogies including disk-type brakes, the improvement wherein a first cylindrical support (10) is concentrically mounted to said axle, axially outside of each said wheel mounted for rotation about its axis via bearings interposed between a hub of said wheel and said axle and having an end proximate to said wheel and spaced axially thereof and having a diameter in excess of the axle and being spaced radially therefrom, a second cylindrical support having a diameter in excess of said first cylindrical support and having an end proximate to said wheel being fixed to said wheel for rotation therewith, a plurality of fixed carbon disks being secured to the outer periphery of said first cylindrical support and extending radially outwardly thereof, a plurality of rotary carbon disks (7) secured to the inner periphery of said second cylindrical support being interposed between respective fixed disks, actuator means fixedly mounted to said shaft aligned with the fixed disks and said rotary disks and including means for pressing the fixed disks against the rotary disks during frictional braking of the railway high speed railway vehicle, temperatures, exceeding 600° C. may develop at the disks during frictional braking of the railway vehicle independent wheels, and wherein said first and second concentric cylindrical supports define a heat sink for said fixed and rotary disks, and said system further comprising a cooling circuit for enabling the heat energy generated by braking to be dissipated and for the temperatures of the carbon disks to be maintained in the range of approximately 300° C. to approximately 600° C., said cooling circuit comprising said axle being hollow over at least the portion of the axle supporting said independent wheels via said bearings interposed between a hub of each wheel and said axle, and a portion of said axle concentrically surrounded by said heat sink and said fixed and rotary disks supported by said concentric cylindrical supports (9, 10), wherein radial holes are provided within said hollow portion of said axle, a plurality of circumferentially spaced holes are formed within said second cylindrical support (9) opening to the exterior of said heat sink, and wherein said cooling circuit further comprises means for supplying cooling air under pressure through said hollow portion of said axle, the space between the hollow portion of the axle and the heat sink, through the space between the end of said first cylindrical support (10) and said wheel in proximity to the bearings and through said circumferentially spaced holes within said second cylindrical support to facilitate cooling of the bearings and dissipation of the thermal energy developed during frictional engagement between the rotary disks and the fixed disks without comprising effective carbon disk braking of the railway vehicle.

2. The braking system according to claim 1, wherein said axle comprises a half axle having a stub axle (3), fixedly attached thereto at opposite ends thereof, and said wheels are rotatable mounted on bearings interposed between a hub of said wheels and the outer periphery of corresponding stub axles, to the side of said heat sink and interposed between said heat sink and said half axle.

3. The braking system according to claim 2, wherein said first disk support is fixed to said stub axle by an end piece (11), and said end piece mounts a plurality of said actuators for pressing the fixed disk (8) against the rotary disk (7) to effect braking of the railway vehicle independent wheels.

4. The braking system according to claim 2, wherein said half axle (1) is hollow and is provided with an axial hole extending through the length thereof and opening to the hollow stub shaft, and wherein said half axle includes a radial hole forming an inlet orifice for said air under pressure for dissipating heat from the heat sink and for cooling said bearings supporting said wheels for independent rotation about said fixed axle.

5. The braking system according to claim 2, wherein said first cylindrical support (10) comprises a plurality of circumferentially spaced radial holes (25) opening to the outside of the braking system heat sink forming expulsion orifices for air under pressure within the space between the outer periphery of the axle and the inner periphery of said first cylindrical support (10) to improve the dissipation of heat generated within said fixed and rotary carbon disks during braking of the independent wheels by pressing the fixed carbon disks against the rotary carbon disks.

* * * * *